(12) United States Patent
Kanao

(10) Patent No.: US 7,870,876 B2
(45) Date of Patent: Jan. 18, 2011

(54) HOSE

(75) Inventor: Shigeki Kanao, Nishinomiya (JP)

(73) Assignee: Kanaflex Corporation Inc., Osaka-shi (JP)

( * ) Notice: Subject to any disclaimer, the term of this patent is extended or adjusted under 35 U.S.C. 154(b) by 685 days.

(21) Appl. No.: 10/589,968

(22) PCT Filed: Nov. 26, 2004

(86) PCT No.: PCT/JP2004/017569

§ 371 (c)(1),
(2), (4) Date: Jan. 4, 2008

(87) PCT Pub. No.: WO2005/080848

PCT Pub. Date: Sep. 1, 2005

(65) Prior Publication Data

US 2008/0202621 A1    Aug. 28, 2008

(30) Foreign Application Priority Data

Feb. 23, 2004    (JP) ............... 2004-046948

(51) Int. Cl.
*F16L 11/00* (2006.01)
(52) U.S. Cl. ............ 138/129; 138/125; 138/122; 138/150; 138/154; 138/133
(58) Field of Classification Search .......... 138/125, 138/122, 124, 129, 150, 153, 154, 133
See application file for complete search history.

(56) References Cited

U.S. PATENT DOCUMENTS

| | | | |
|---|---|---|---|
| 3,047,026 A | 7/1962 | Kahn | 138/122 |
| 4,628,966 A * | 12/1986 | Kanao | 138/122 |
| 5,046,531 A * | 9/1991 | Kanao | 138/122 |
| 5,129,428 A * | 7/1992 | Winter et al. | 138/104 |
| 5,394,904 A * | 3/1995 | Winter et al. | 138/137 |
| 5,601,119 A * | 2/1997 | Kanao | 138/133 |
| 5,819,518 A * | 10/1998 | Kanao | 57/3 |
| 6,186,183 B1 | 2/2001 | Lepoutre | 138/125 |
| 6,701,968 B2 * | 3/2004 | Bolonhezi | 138/132 |

FOREIGN PATENT DOCUMENTS

| | | |
|---|---|---|
| EP | 0 936 389 A1 | 8/1999 |
| FR | 2 775 049 | 8/1999 |
| JP | 11-280959 | 10/1999 |
| JP | 2001-004075 | 1/2001 |

* cited by examiner

*Primary Examiner*—Patrick F Brinson
(74) *Attorney, Agent, or Firm*—Kratz, Quintos & Hanson, LLP

(57) ABSTRACT

A hose having both excellent flexibility and shape retainability and advantageous in construction efficiency and cost efficiency. The hose comprises hard synthetic resin reinforcement material (2) spirally fed and having, on both sides of the top part (2D) thereof in the tube axial direction, receiving surfaces (2a) and (2b) positioned on the radial inner side toward the end part thereof and a soft synthetic resin hose body for covering the spirally fed reinforcement materials (2). The reinforcement materials (2) are spirally fed in the state of the top parts being positioned on the radial outer side thereof, a soft synthetic resin tape material (3) is fed to the fed reinforcement (2), and while covering parts (3A) projected in a generally arc shape to the center of the reinforcement materials (2) by melting the tape material or with an adhesive agent.

9 Claims, 10 Drawing Sheets

(a)

(b)

HOSE

TECHNICAL FIELD

The present invention relates to hoses used for guiding gases, liquids, particles or powders, including air-conditioning hoses with flexibility, connecting hoses for various types of blowers and vent fans, guide hoses for particles and powders, and guide hoses for liquid bodies. The guide hoses for gaseous matters such as air-conditioning hoses and connecting hoses are generally called ducts.

RELATED ART

The duct, as an example of the above mentioned hoses, needs to be light-weighted, have shape-retaining properties, and preferably, have flexibility as well. As a conventional duct, suggested is a spiral hose in which a spiral core material is joined with a synthetic resin coating film (for example, see patent document 1).

Patent document 1: Japanese Unexamined Patent Publication No. 8-296888 (see FIG. 1).

DISCLOSURE OF THE INVENTION

Technical Problems to be Solved

According to the above mentioned patent document 1, since the synthetic resin coating film forms a flat wall both on the inside and outside of the duct, the flexibility of the construction is not sufficient and greatly affected by the material and thickness of the synthetic resin coating film. For reference, selecting a material and thickness for higher flexibility would decrease the shape-retaining properties of the duct, and thus the flat walls as mentioned above could hardly achieve both sufficient flexibility and shape-retaining properties. The walls may be shaped like an accordion for more flexibility, but the accordion conformation does not allow the duct inside surface to be flat, resulting in a trouble to be resolved in association with higher air resistance.

Moreover, although not shown in the aforesaid patent document, the above mentioned core material, in most cases, is square or circular in cross section. Such a square or circular core material makes it difficult to ensure a maximum large angle of bend, and thus cannot be used for a duct that will be employed at locations where it needs to be bent by a large amount. This requires a separately formed duct that will bring about disadvantages in construction efficiency and cost efficiency.

In light of the above described circumstances, an object of the present invention is to provide a hose that has both excellent flexibility and shape retainability and is also advantageous in construction efficiency and cost efficiency.

Means to Solve the Problems

For resolving the above described problems, the present invention comprises hard synthetic resin reinforcement materials spirally fed and having, on both sides of the top part thereof in the tube axial direction, receiving surfaces positioned on the radial inner side toward the end part thereof and a soft synthetic resin hose body for covering the spirally fed reinforcement materials, wherein the reinforcement materials are spirally fed in the state of the top parts being positioned on the radial outer side thereof, a soft synthetic resin tape material is fed to the fed reinforcement materials, and while covering parts projected in a generally arc shape to the center of the hose are formed between the reinforcement materials, the tape material is fixed to the surfaces of the reinforcement materials by melting the tape material or with an adhesive agent, and thus the hose body having a generally flat inner surface and formed in a generally circular shape in cross section can be provided.

As stated above, by configuring the reinforcement materials as to comprise receiving surfaces positioned on the radial inner side toward the end part thereof, the receiving action of the receiving surfaces allows the tape material located between the reinforcement materials to project in a generally arc shape toward the center of the hose, so that it is possible to ensure the maximum angle of bend in the hose by a large amount. This will be described in detail with the use of FIGS. 17 (*a*) and (*b*). FIG. 17 (*a*) shows the inner part of the hose bent at a predetermined angle where each reinforcement material 2 having a pair of inclined receiving surfaces 2*a* and 2*b* on both sides of the top part 2D thereof in the tube axial direction and formed in a triangular shape at cross section, is covered by a tape material 3. FIG. 17 (*b*) depicts the inner part of the hose bent at the same predetermined angle as shown in FIG. 17 (*a*) where each reinforcement material 2K with a circular cross section is covered by a tape material 3. From a comparison between the two hoses, it is found that a distance S1 between the reinforcement materials 2 and 2 in FIG. 17 (*a*) is larger than a distance S2 between the reinforcement materials 2K and 2K in FIG. 17 (*b*), whereby the hose in FIG. 17 (*a*) has the advantage in ensuring a larger maximum angle of bend. Moreover, by forming the covering parts between the reinforcement materials so as to be projected in a generally arc shape to the center of the hose, the circular covering parts are easier to fold down and offer sufficient flexibility. Although the reinforcement materials 2 with a triangular cross section are shown in FIG. 17 (*a*), they may take any other forms, provided that they comprise receiving surfaces 2*a* and 2*b* on the both sides of the top part 2D.

Additionally, the use of a reinforcement material having a flat bottom surface and a generally trapezoidal or generally triangular cross section would generate a smaller gap between the reinforcement material and the covering part as compared to that with a circular or square reinforcement material, bringing about the advantage that the inner surface thereof can be made substantially flat.

Furthermore, the covering part is made of soft synthetic resin so as to fit more comfortably in the hand as compared with the one made of hard synthetic resin.

Preferably, the receiving surface of the reinforcement material is made flat and the angle formed by the flat bottom surface and the receiving surface of the reinforcement material is set within a range of 30 to 80 degrees.

The tape material has a width of approximately one pitch extending over two reinforcement materials adjacent to each other in the longitudinal direction of the hose body, and tape materials adjacent to each other in the longitudinal direction of the hose body are melt-welded in a partly overlapped state to the reinforcement material, whereby it becomes possible to favorably absorb an impactive force to be transferred to the hose with the tape material on the reinforcement material, which is twice as thick as the tape material between the reinforcement materials. In addition to that, the tape portions not requiring a greater thickness, i.e., the tape portions between the reinforcement materials, are not unnecessarily made thicker, thereby preventing a weight increase.

It is possible to generate a smaller gap between the angular parts on the both sides on the bottom surface of the reinforcement material and the covering part by forming the receiving surface constituting the inner surface of the hose and extending from the angular parts on the both sides to top part on the bottom surface of the reinforcement material in such a manner that the receiving surface becomes a curved surface along the inside surface of the covering part projected in a circular shape.

If the dimension of the bottom surface of the reinforcement material in the hose axial direction is set to be smaller than that of the covering part positioned between the reinforcement materials in the hose axial direction, the flexibility of the hose can be enhanced. If the dimension of the bottom of the reinforcement material in the hose axial direction is set to be larger than that of the covering part positioned between the reinforcement materials in the hose axial direction, the hose can be increased in strength. If the dimension of the bottom of the reinforcement material in the hose axial direction is set to be the same as that of the covering part positioned between the reinforcement materials in the hose axial direction, the flexibility and strength of the hose can be improved in the same degree.

The inside surface of the hose may be formed substantially flat by covering the bottom surface of the reinforcement material and the inner surface of the covering part with a soft resin lower in hardness than the tape material.

The reinforcement material is halved into inner and outer parts in the direction of the radius of the hose, the outer half part along the radius of the hose is formed from a hard synthetic resin and the inner half part along the radius of the hose is formed from a soft synthetic resin, so that it is possible to keep the strength of the hose as desired at the outer part formed from a hard synthetic resin and even increase the flexibility of the hose as compared to a hose whose reinforcement material is entirely formed from a hard synthetic resin.

Preferably, the tape material is made of EVA resin and the reinforcement material is made of polyethylene. The tape material formed by EVA resin would be of high transparency and thus allows to see through a flow of fluid such as gases, particles or powder inside thereof. These EVA resin and polyethylene can be easily disposed of by incineration because they are low in ash content and produce no poisonous gas when being burnt. The existing hoses are made of PVC whose specific gravity is about 1.3. When compared to that, EVA resin and polyethylene have a specific gravity of 0.9 and permit 30% weight saving over the PVC hoses. EVA with a 40 to 50 Shore D grade has been considered to be unsuitable for hose forming by a winding technique as mentioned above, but a conformation of the present invention allows to produce a highly flexible hose (hose) even by such a material.

Effect of the Invention

The use of the reinforcement materials with the receiving surfaces allows the tape material between the reinforcement materials to be projected in a generally arc shape toward the center of the hose, whereby the hose can be lighter than ones with circular or square reinforcement materials. Furthermore, this allows to provide a maximum angle of bend by a large amount and generate a smaller gap between the reinforcement material and the covering part as compared to the circular or square reinforcement material, thereby allowing the inner surface to be made substantially flat. Therefore, it is possible to provide a hose particularly suitable for air conditioners (also called duct) that is advantageous in construction efficiency with which a path can be formed at any angle and also is advantageous in both cost and weight reduction. Further, the covering part is formed between the reinforcement materials so as to be projected in a generally arc shape to the center of the hose, whereby the arc-shaped covering part can be easily folded down with sufficient flexibility.

Further, the covering part is made of soft synthetic resin and thus fits easily in the hand with an advantage in ease of handling compared to the one made of hard synthetic resin.

Further, the receiving surface of the reinforcement material is made flat and the angle formed by the flat bottom surface and the receiving surface of the reinforcement material is set within a range of 30 to 80 degrees, so that the tape material positioned between the reinforcement materials can be smoothly and reliably projected in a generally arc shape to the center of the hose.

The tape material has a width of approximately one pitch extending over two reinforcement materials adjacent to each other in the longitudinal direction of the hose body, and tape materials adjacent to each other in the longitudinal direction of the hose body are melt-welded in a partly overlapped state to the reinforcement material, whereby it becomes possible to favorably absorb an impactive force to be transferred to the hose with the tape material on the reinforcement material, which is twice as thick as the tape material between the reinforcement materials. This makes it possible to increase durability while preventing a weight increase.

It is possible to generate a smaller gap between the angular parts on the both sides on the bottom surface of the reinforcement material and the covering part by forming the receiving surface constituting the inner surface of the hose and extending from the angular parts on the both sides to top part on the bottom surface of the reinforcement material in such a manner that the receiving surface becomes a curved surface along the inside surface of the covering part projected in a circular shape. This allows to reduce the resistance to the flow of air and also avoid trouble like foreign objects such as dust from staying in the gap, for example.

If the dimension of the bottom surface of the reinforcement material in the hose axial direction is set to be smaller than that of the covering part positioned between the reinforcement materials in the hose axial direction, it is possible to form a hose suitable for use in locations where flexibility is required in particular. If the dimension of the bottom of the reinforcement material in the hose axial direction is set to be larger than that of the covering part positioned between the reinforcement materials in the hose axial direction, it is possible to form a hose particularly suitable for use in locations where strength is required in particular. If the dimension of the bottom of the reinforcement material in the hose axial direction is set to be the same as that of the covering part positioned between the reinforcement materials in the hose axial direction, it is possible to form a hose suitable for use in locations where flexibility and strength are required in the same degree.

The inside surface of the hose may be formed substantially flat by covering the bottom surface of the reinforcement material and the inner surface of the covering part with a soft resin lower in hardness than the tape material. This substantially reduces the resistance to the flow of air and reliably avoids trouble like foreign objects such as dust from staying between the reinforcement material and the covering part, for example.

The reinforcement material is halved into inner and outer parts in the direction of the radius of the hose, the outer half part along the radius of the hose is formed from a hard synthetic resin and the inner half part along the radius of the hose is formed from a soft synthetic resin, so that it is possible to keep the strength of the hose as desired at the outer part formed from a hard synthetic resin and even increase the flexibility of the hose as compared to a hose whose reinforcement material is entirely formed from a hard synthetic resin. This makes it possible to obtain a hose with high commercial value.

The tape material formed by EVA resin would be of high transparency and thus allows to see through a flow of fluid such as air, particles or powder inside, check for adhesion of foreign objects such as dust and recognize the degree of contamination inside. These EVA resin and polyethylene can be easily disposed of by incineration because they are low in ash content and produce no poisonous gas when being burnt, offering an advantage in environmental protection.

BRIEF DESCRIPTION OF THE DRAWINGS

FIG. 17 (a) shows the case where the cross section of the reinforcement material is triangular, and FIG. 17 (b) shows the case where the cross section of the reinforcement material is circular.

DESCRIPTION OF THE NUMERALS

Figure 1:
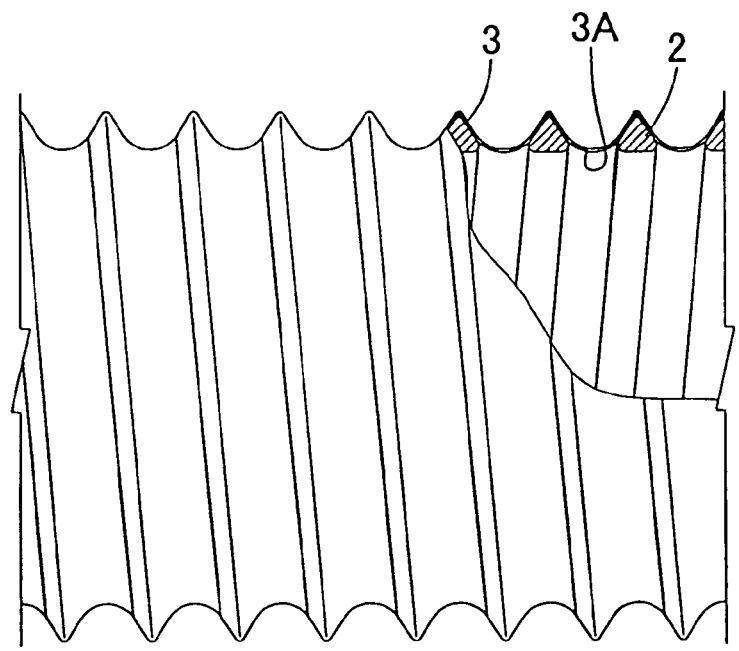
FIG. 1 is a side view of cross section of a portion of a hose.

1 . . . Former
2 . . . Reinforcement material
2C . . . Bottom surface
2D . . . Top part
2K . . . Reinforcement material
2X . . . Outer part
2Y . . . Inner part
2U . . . Concave part
3 . . . Tape material
3A . . . Covering part
3Z . . . Inside surface
3S . . . Arc part
3T . . . Flat part
4 . . . Extruder
2A, 2B . . . Angular part
2a, 2b . . . Inclined surface (receiving surface)
2A, 2B . . . Two-side angular parts
5 . . . Extruder
6 . . . Coating layer
6A . . . Hose inside surface
7 . . . Cylindrical member
A . . . Arrow
B . . . Mark
S1, S2 . . . Distance
θ . . . Angle

BEST MODE FOR CARRYING OUT THE INVENTION

Figure 2:
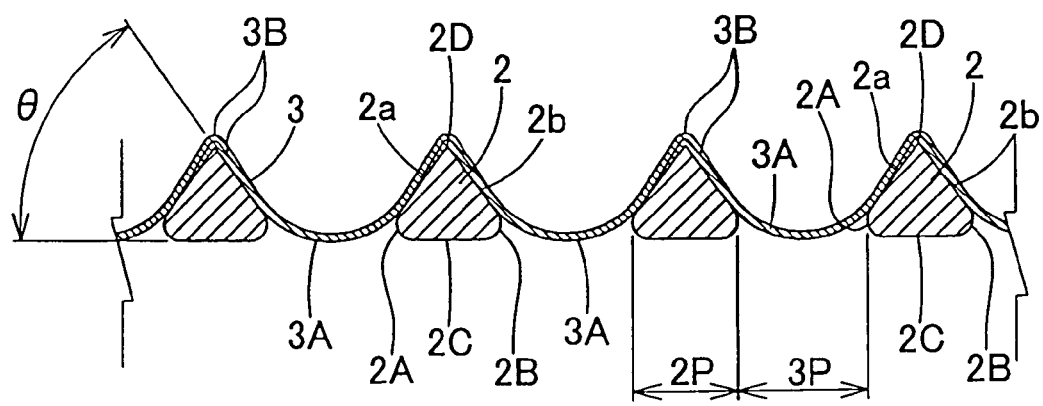
FIG. 2 is an end view showing the upper part of the hose.

FIG. 1 and FIG. 2 show hoses for air conditioners (hoses used for air conditioners are generally called duct). The hose can be used as duct (connecting hose) for guiding air in various blowers and vent fans as well as air conditioners, and it may also be of any type for guiding liquid, particle or powder substances. A hose of the present invention is useful particularly in situations where it is required to be lightweight, have shape retainability and also flexibility.

Figure 3:
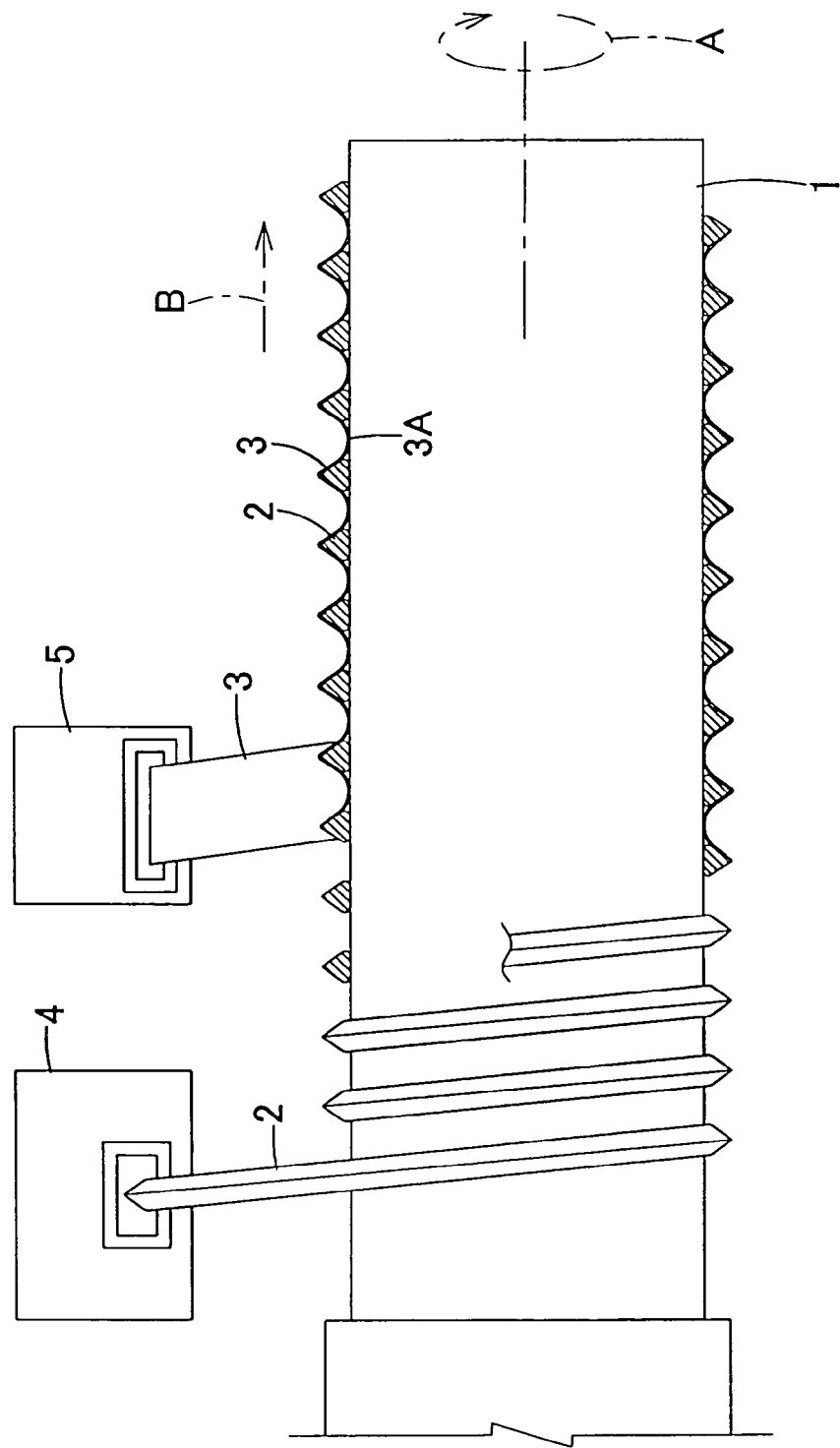
FIG. 3 is a side view showing the situation in which a hose is being manufactured using a hose forming apparatus.

As shown in FIG. 1 and FIG. 2, the hose is manufactured by a hose forming apparatus shown in FIG. 3. The hose forming apparatus comprises a former 1 as a driven rotary body that is driven and rotated in the direction of an arrow A shown in the figure, and two extruders 4 and 5 for extruding a reinforcement material 2 and a tape material 3 constituting a hose body, onto the former 1. Therefore, the reinforcement material 2 is extruded by the extruder 4 and wound spirally on the former 1, and then moved successively in the direction of an arrow B shown in the figure. Then the molten tape material 3 of a predetermined width (here, it is a length of one pitch over the two adjacent reinforcement materials 2 in the hose radial direction, but may be of any other length.) is fed onto the reinforcement material 2 to form a covering part 3A projected in a generally arc shape to the center side of the hose in the hose axial direction between the reinforcement materials 2 and 2 while melt-welding the tape material 3 to two inclined surfaces 2a and 2b of the reinforcement material 2, thereby forming a hose body so as to be flat on the inside and substantially circular at cross section.

Figure 4:
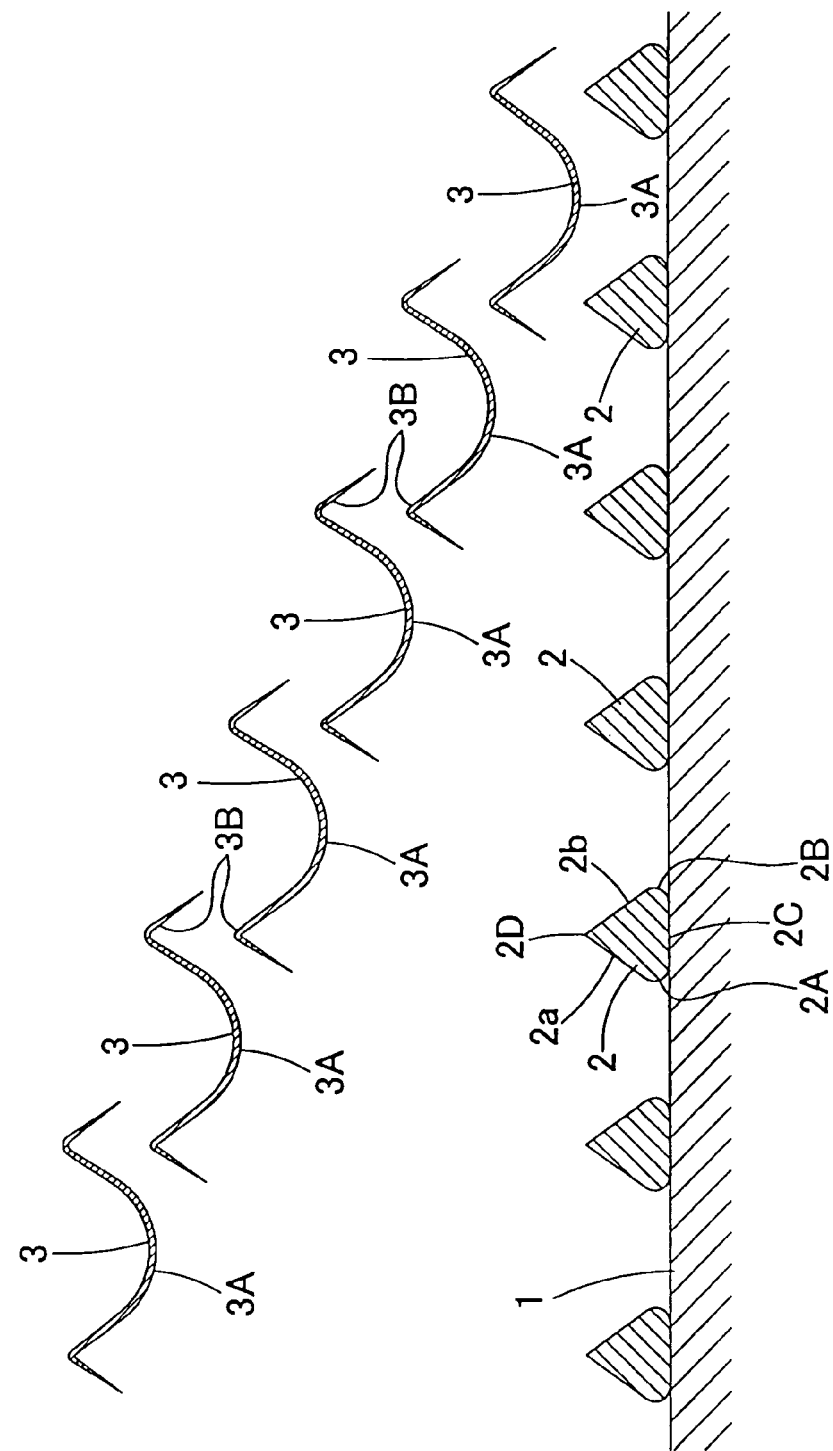
FIG. 4 is an illustrative cross sectional view showing the situation in which tape materials are fed to reinforcement materials fed in a spiral form.

As shown in FIG. 2 and FIG. 4, the reinforcement material 2 is formed in such a manner as to have a generally triangular cross section and comprise the two inclined surfaces (receiving surfaces) 2a and 2b positioned on the radial inner side toward the end part thereof, on both sides of the top part 2D, and the end portions of the tape material 3 placed on the reinforcement material 2 are overlapped with each other, whereby the tape material 3 on the inclined surfaces 2a and 2b is twice as thick as the covering part 3A. With such a conformation, an impactive force to be transferred to the reinforcement material 2 can be favorably absorbed in the tape material 3 doubled in thickness. Alternatively, the both overlapped sides of the tape material 3 may be reduced in thickness in about half of the other portions so that all the portions become of uniform thickness.

As shown in FIG. 2, preferably, an angle θ formed by the flat inclined surface (receiving surface) 2b (or 2a) and the flat bottom surface 2C is set within a range of 30 to 80 degrees. In FIG. 2, set to be identical are the angle formed by the one flat inclined surface (receiving surface) 2a and the flat bottom surface 2C and the angle formed by the other flat inclined surface (receiving surface) 2b and the flat bottom surface 2C, that is, the angles of inclination of the two inclined surfaces. However, they may be set to be different from each other. Further, the inclined surfaces are flat in FIG. 2, but they may be curved surfaces instead.

The reinforcement material 2 is made of hard polyethylene (any other hard synthetic resin may be acceptable), and its bottom surface (the surface constituting the inside of the hose) 2C is flat (planiform) and its outer shape as seen along the longitudinal direction of the hose, that is, as shown in FIG. 1 and FIG. 2, the outer shape of the cross section along the longitudinal direction of the hose is substantially triangular, but may be substantially trapezoidal instead. Nevertheless, the triangle shape is preferable to the trapezoidal shape because the former has an advantage in increasing a larger maximum angle of bend.

Figure 5:
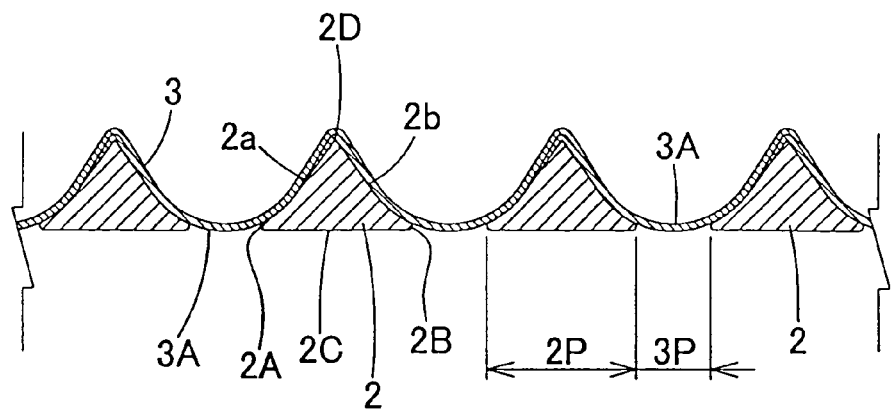
FIG. 5 is an end view showing the upper part of a hose formed by reinforcement materials of another shape.

The reinforcement material 2 has the angular parts 2A and 2B rounded off so as to take an arc shape, on the both sides of the bottom surface thereof, but these parts may have relatively sharpened angles as shown in FIG. 5. In this case, the inclined surfaces 2a and 2b extending from the both angular parts 2A and 2B toward the top part 2D may be formed into curved surfaces along the covering part 3A projected in an arc shape, thereby making smaller a gap between the both angular parts 2A and 2B and the covering part 3A. The other conformations not described in relation to FIG. 5 are identical to that shown in FIG. 2. The reinforcement material 2 is configured in such a manner that the covering part 3A is not welded to the angular parts 2A and 2B on the both sides of bottom surface thereof, thereby offering an advantage in the flexibility of the hose.

The tape material 3 is preferably EVA resin (ethylene-vinyl acetate) as soft resin, but may use any other types of soft synthetic resin. Further, the molten tape material 3 is extruded from the extruder 5 onto the upper surface of the reinforcement material 2 and melt-welded to the two receiving surfaces 2a and 2b of the reinforcement material 2, so that it is possible to make up the hose while forming the covering part 3A under its own weight. The curvature radius of a curve of the covering part 3A varies in spatial size or shape depending on the tension applied to between the reinforcement materials 2 and 2 of the material tape 3, the pitch between the reinforcement materials 2 and 2, the weight and thickness of the tape material 3 between the reinforcement materials 2 and 2, the size and shape of the reinforcement material 2, and the like, and preferably, is set within a range that the curvature radius of curve of the covering part 3A is R=(1/10)×D−(1/25)×D is met, where D is the inside diameter of the hose. Although the tape material 3 here is melt-welded to the reinforcement material 2, the tape material 3 may be firmly attached to the reinforcement material 2 by an adhesive.

Figure 15:
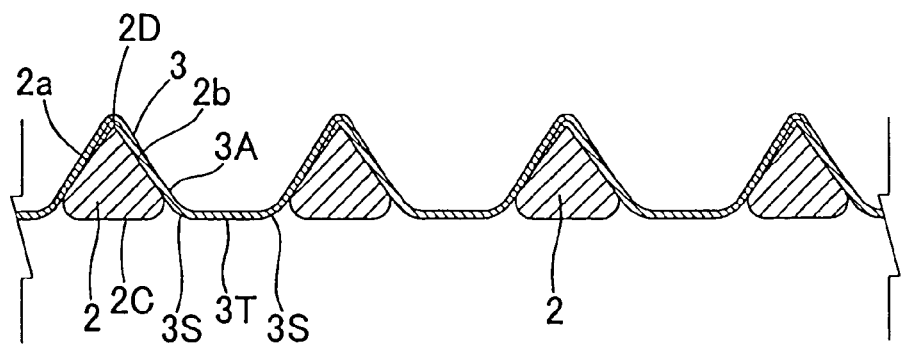
FIG. 15 is an end facet view showing the upper part of a hose comprising two arc portions in a covering part between reinforcement materials adjacent to each other in the tube axial direction.

Further, as shown in FIG. 15, the covering part 3A may comprise an arc part 3S on the both sides thereof positioned between the reinforcement materials 2 and 2 adjacent to each other in the tube axial direction, and the portion between these two arc parts 3S and 3S may be formed of a straight flat part 3T. In this case as well, the covering part 3A is projected in a generally arc shape to the center of the hose.

Figure 6:
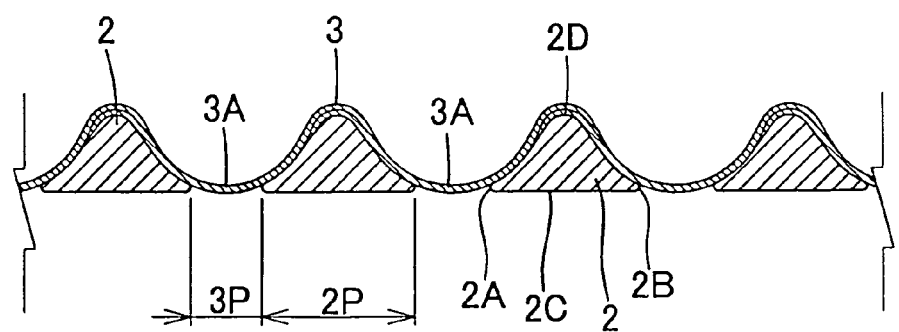
FIG. 6 is an end view showing the upper part of a hose formed by reinforcement materials of another shape with a slightly rounded top.
Figure 16:
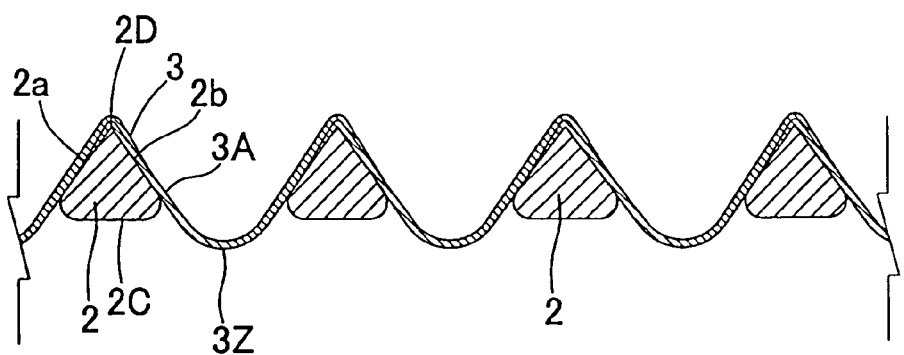
FIG. 16 is an end view showing the upper part of a hose in which the bottommost portion of the covering part is projected radially inward of the bottom surface of the reinforcement material.
Figure 17:
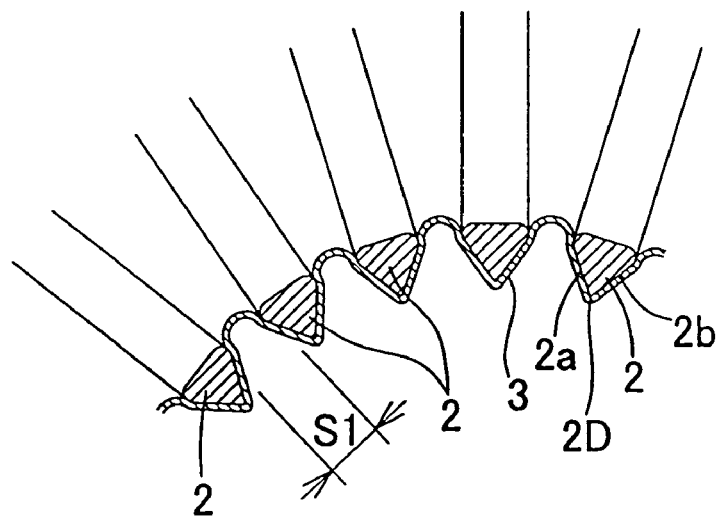
FIG. 17 is a cross sectional view showing the inside parts of hoses bent at the identical angles.
Figure 17:
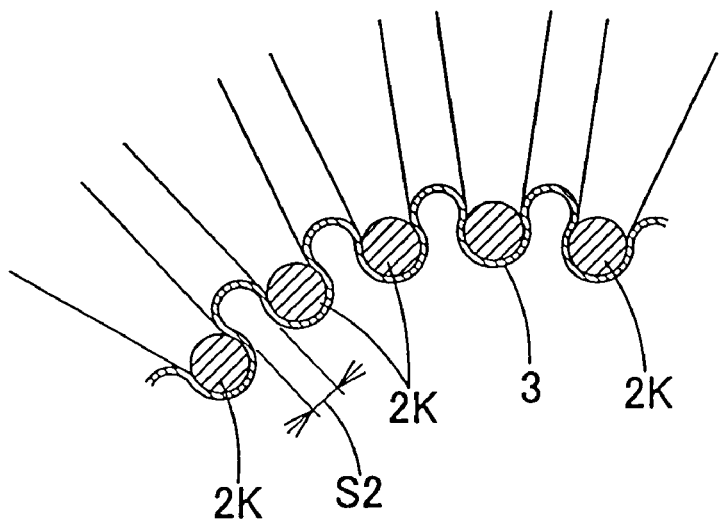

Moreover, in FIG. 2, FIG. 5 and FIG. 6, the inside surface of the bottommost part of the covering part 3A is formed as to be substantially flush with the bottom surface 2C of the reinforcement material 2. As shown in FIG. 16, however, an inside surface 3Z of the bottommost part of the covering part 3A may be implemented so as to be slightly projected radially inward of the bottom surface 2C of the reinforcement material 2. In this case as well, the inside surface of the hose is substantially flat.

Figure 7:
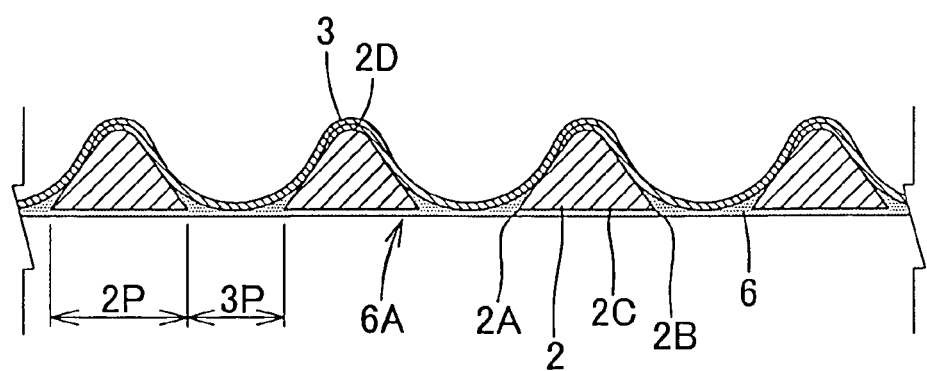
FIG. 7 is an end view showing the upper part of a hose whose inside surface is provided with a coating layer so as to be flat.

The top part of the reinforcement material 2 with a triangular cross section shown in FIG. 5 may be projected in an arc shape radially outward of the hose as shown in FIG. 6 and FIG. 7. Further, the cross section of the reinforcement material 2 may be formed so that the dimension of the reinforcement material 2 becomes gradually smaller from the bottom surface 2C to the top part 2D along the hose axial direction, and the shape of the cross section shown in FIG. 8 may also be a trapezoid or semicircle, but the shape where the top part 2D is narrowest, such as a triangle, would be more advantageous both in weight reduction and flexibility.

Figure 11:
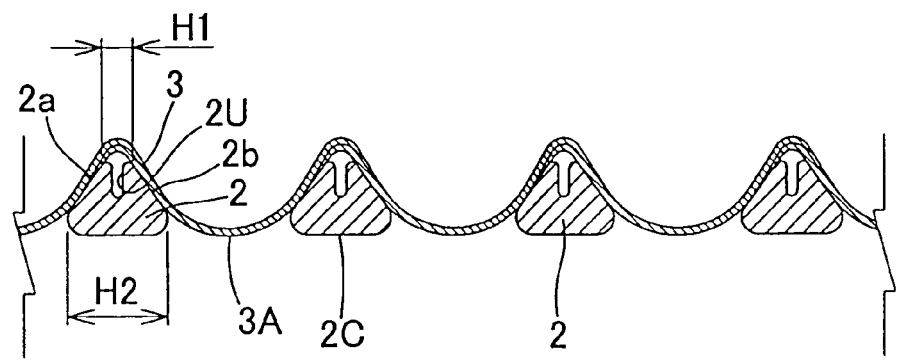
FIG. 11 is an end view showing the upper part of a hose formed by reinforcement materials of another shape.
Figure 12:
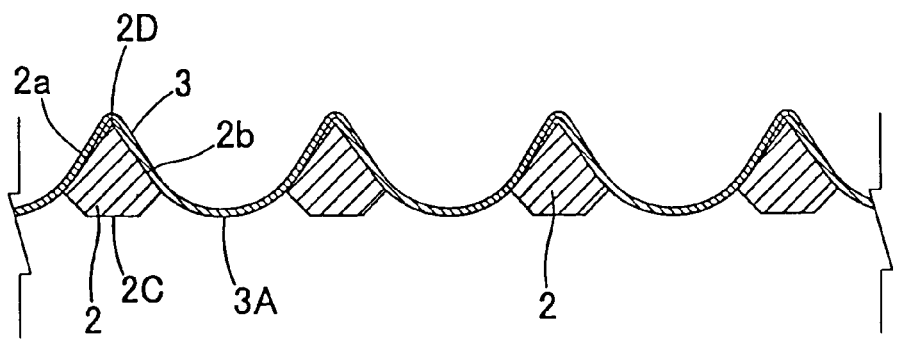
FIG. 12 is an end view showing the upper part of a hose formed by reinforcement materials of another shape.
Figure 13:
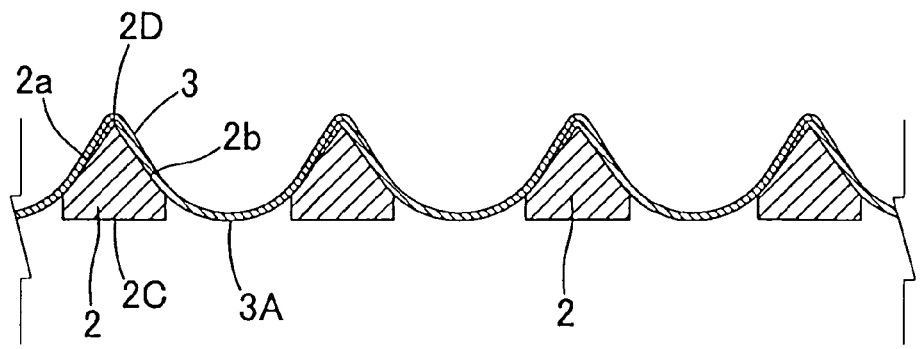
FIG. 13 is an end view showing the upper part of a hose formed by reinforcement materials of another shape.
Figure 14:
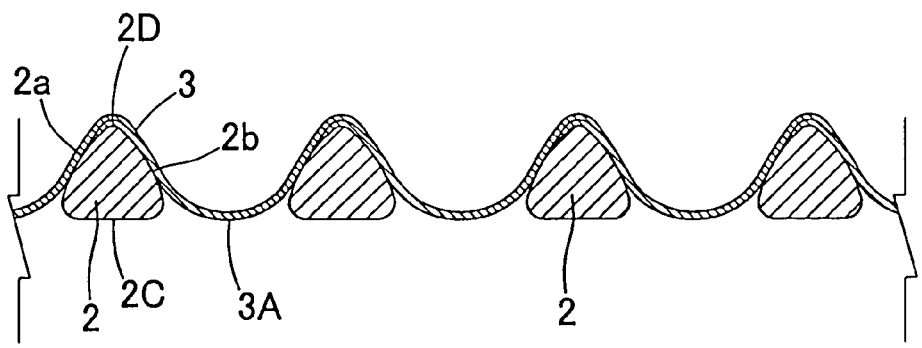
FIG. 14 is an end view showing the upper part of a hose formed by reinforcement materials of another shape.

Moreover, the reinforcement material 2 can have any shape at cross section, provided that it comprises a pair of receiving surfaces 2a, 2b, and for example, may have a concave portion (this is U-shaped in the figure, but may be of any other shapes including a square and arc) 2U in the top part as shown in FIG. 11, may have a pentagonal shape like a diamond as shown in FIG. 12, or may have a pentagonal shape as shown in FIG. 13. Using a space formed by the concave portion 2U shown in FIG. 11 for storage of electric wires would offer an advantage that wiring operation can be completed only by installing the hose. Further, as shown in FIG. 14, the reinforcement material 2 may have the pair of receiving surfaces 2a and 2b formed as curved surfaces projected in an arc shape toward the outside (or inside) of the reinforcement material 2. As described above, the reinforcement material 2 may take any shape, provided that the size (width) H2 of the bottom surface 2C in the tube axial direction is set to be larger (wider) than the size (width) H1 of the top part 2D in the tube axial direction and that the top part 2D comprises a pair of inclined surfaces 2a and 2b on the both sides thereof (see FIG. 11).

Figure 8:
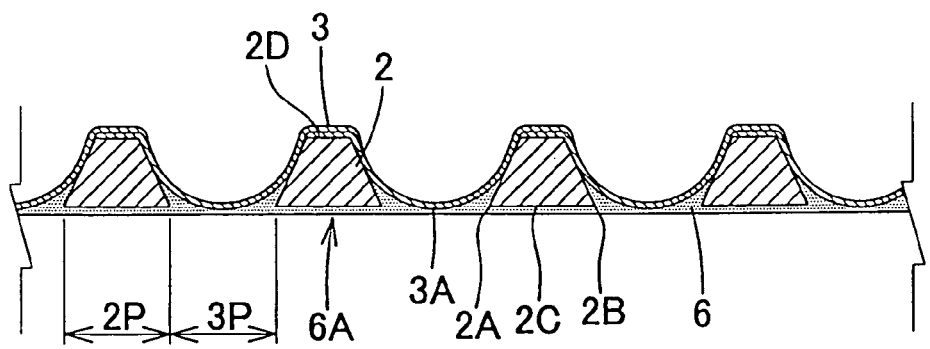
FIG. 8 is an end view showing the upper part of a hose formed by reinforcement materials different in shape from the ones shown in FIG. 7.
Figure 9:
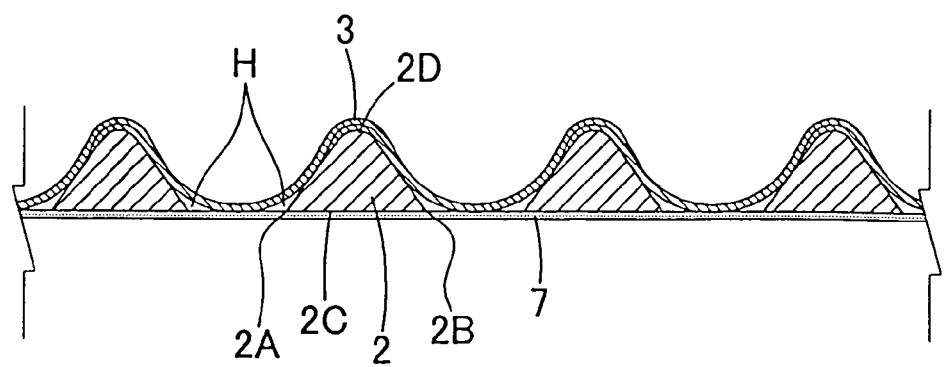
FIG. 9 is an end view showing the upper part of a hose whose inner surface is provided with a cylindrical member so as to be flat.

As shown in FIG. 7 and FIG. 8, the hose is provided with a coating layer 6 by covering the bottom surface 2C of the reinforcement material 2 and the inside surface of the covering part 3A with soft resin lower in hardness than the tape material 3, whereby the hose inside surface 6A is formed almost flat. The coating layer 6 is preferably formed as thinner as possible, and for example, preferably set to be 0.6 mm to 2.0 mm thick at the maximum-thickness portion and 0.2 mm to 0.8 mm thick at the minimum-thickness portion. In FIG. 7 and FIG. 8, the hose inside surface 6A is formed almost flat by injecting soft resin into the bottom surface 2C of the reinforcement material 2 and the inside surface of the covering part 3A. Alternatively, the hose may be formed by winding a tape material lower in hardness than the tape material 3 on the former 1 shown in FIG. 1 and feeding the reinforcement material 2 and the tape material 3 onto the cylindrical member 7, as shown in FIG. 9 so that clearances H and H are created between the both sides of the covering part 3A in the hose axial direction and the corresponding portions of the cylindrical member 7, thereby bringing about an advantage in the flexibility of the hose as compared with the hoses shown in FIG. 7 and FIG. 8. The soft synthetic resin constituting the coating layer 6 preferably uses a soft material with a hardness of about 55 to 65 specified in JIS A. More specifically, the kind of the synthetic resin to be used is preferably EPM (ethylene-propylene copolymer resin).

In FIG. 2 and FIG. 8, the dimension 2P of bottom surface 2C of the reinforcement material 2 in the hose axial direction is set to be smaller than a dimension 3P of the covering part 3A in the hose axial direction positioned between the reinforcement materials 2 and 2. In FIG. 6 and FIG. 7, the dimension 2P of the bottom surface 2C of the reinforcement material 2 in the hose axial direction is set to be larger than the dimension 3P of the covering part 3A in the hose axial direction positioned between the reinforcement materials 2 and 2. In FIG. 8, the dimension 2P of bottom surface 2C of the reinforcement material 2 in the hose axial direction is set to be identical to the dimension 3P of the covering part 3A in the hose axial direction positioned between the reinforcement materials 2 and 2. However, these dimensions are not limited to those shown in the figures.

Figure 10:
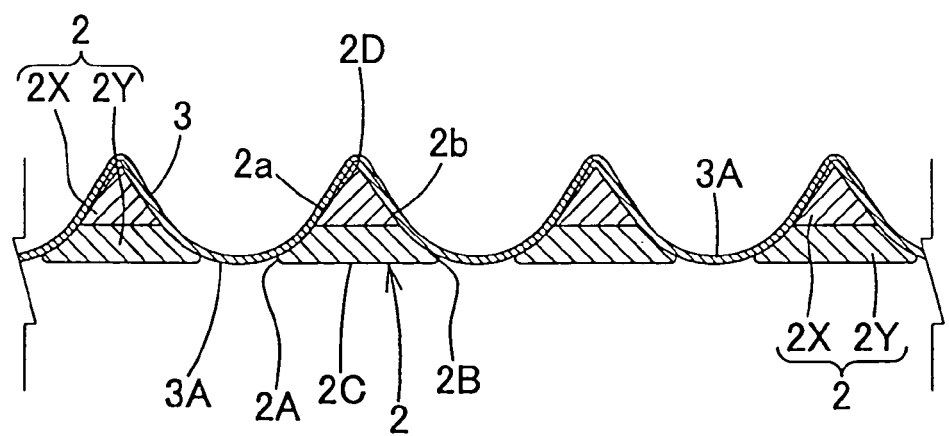
FIG. 10 is an end view showing the upper part of a hose formed by reinforcement materials that are split-formed by resins radially different in hardness.

The hose may be configured as shown in FIG. 10. Specifically, the reinforcement material 2 shown in FIG. 5 is halved into inner and outer part in the hose radial direction, the outer part 2X in the hose radial direction is a hard synthetic resin, and the inner part 2Y in the hose radial direction is a soft synthetic resin. With this, the reinforcement material 2 becomes easy to be deformed at the angular parts 2A and 2B that are extended from the both sides of bottom surface of the reinforcement material 2 and melt-welded to the tape material 3, and simultaneously the desired strength of the hose can be maintained at the hard outer part 2X, whereby it is possible to minimize a decrease in the flexibility of the hose. The hose may be formed in such a manner that two extruders for extruding hard synthetic resin and soft synthetic resin are provided, synthetic resins extruded from these extruders are integrated into the reinforcement material 2, the reinforcement material 2 is fed to the former, and then the tape material 3 is wound on the former. Alternatively, the hose may be formed in such a manner that the previously formed reinforcement material 2 is fed to the former and then the tape material 3 is wound on the former.

The invention claimed is:

1. A hose comprising hard synthetic resin reinforcement materials spirally fed, the hose having a top part with two sides, and having, on both of the two sides of the top part thereof in the tube axial direction, receiving surfaces positioned on the radial inner side toward the end part thereof and a soft synthetic resin hose body for covering the spirally fed reinforcement materials,
   wherein the reinforcement materials are spirally fed in the state of the top parts being positioned on the radial outer side thereof, a soft synthetic resin tape material is fed to the fed reinforcement materials, and while covering parts projected in a generally arc shape to the center of the hose are formed between the reinforcement materials, the tape material is fixed to the surfaces of the reinforcement materials by melting the tape material or with an adhesive agent, and thus the hose body having a generally flat inner surface and formed in a generally circular shape in cross section can be provided, and
   wherein the tape material has a width of approximately one pitch extending over two reinforcement materials adjacent to each other in the longitudinal direction of the hose body, and the hose body is formed by melt-welding tape materials adjacent to each other in the longitudinal direction of the hose body in a partly overlapped state to the reinforcement material.

2. A hose comprising hard synthetic resin reinforcement materials spirally fed, the hose having a top part with two sides, and having, on both of the two sides of the top part thereof in the tube axial direction, receiving surfaces positioned on the radial inner side toward the end part thereof and a soft synthetic resin hose body for covering the spirally fed reinforcement materials,
   wherein the reinforcement materials are spirally fed in the state of the top parts being positioned on the radial outer side thereof, a soft synthetic resin tape material is fed to the fed reinforcement materials, and while covering parts projected in a generally arc shape to the center of the hose are formed between the reinforcement materials, the tape material is fixed to the surfaces of the reinforcement materials by melting the tape material or with an adhesive agent, and thus the hose body having a generally flat inner surface and formed in a generally circular shape in cross section can be provided, and
   wherein the inside surface of the hose may be formed substantially flat by covering the bottom surface of the reinforcement material and the inner surface of the covering part with a soft resin lower in hardness than the tape material.

3. A hose comprising hard synthetic resin reinforcement materials spirally fed, the hose having a top part with two sides, and having, on both of the two sides of the top part thereof in the tube axial direction, receiving surfaces positioned on the radial inner side toward the end part thereof and a soft synthetic resin hose body for covering the spirally fed reinforcement materials,
   wherein the reinforcement materials are spirally fed in the state of the top parts being positioned on the radial outer side thereof, a soft synthetic resin tape material is fed to the fed reinforcement materials, and while covering parts projected in a generally arc shape to the center of the hose are formed between the reinforcement materials, the tape material is fixed to the surfaces of the reinforcement materials by melting the tape material or with an adhesive agent, and thus the hose body having a generally flat inner surface and formed in a generally circular shape in cross section can be provided, and
   wherein the reinforcement material is halved into inner and outer parts in the direction of the radius of the hose, the outer half part along the radius of the hose is formed from a hard synthetic resin and the inner half part along the radius of the hose is formed from a soft synthetic resin.

4. A hose comprising hard synthetic resin reinforcement materials spirally fed, the hose having a top part with two sides, and having, on both of the two sides of the top part thereof in the tube axial direction, receiving surfaces positioned on the radial inner side toward the end part thereof and a soft synthetic resin hose body for covering the spirally fed reinforcement materials,
   wherein the reinforcement materials are spirally fed in the state of the top parts being positioned on the radial outer side thereof, a soft synthetic resin tape material is fed to the fed reinforcement materials, and while covering parts projected in a generally arc shape to the center of the hose are formed between the reinforcement materials, the tape material is fixed to the surfaces of the reinforcement materials by melting the tape material or with an adhesive agent, and thus the hose body having a generally flat inner surface and formed in a generally circular shape in cross section can be provided, and
   wherein the tape material is EVA resin and the reinforcement material is polyethylene.

5. The hose according to any one of claims 1, 2, 3 and 4 wherein the receiving surface constituting the inner surface of the hose and extending from the angular parts on the both sides to top part on the bottom surface of the reinforcement material are formed in such a manner as to become a curved surface along the inside surface of the covering part projected in a circular shape.

6. The hose according to any one of claims 1, 2, 3 and 4, wherein the dimension of the bottom surface of the reinforcement material in the hose axial direction is set to be smaller than that of the covering part positioned between the reinforcement materials in the hose axial direction.

7. The hose according to any one of claims 1, 2, 3 and 4, wherein the dimension of the bottom of the reinforcement material in the hose axial direction is set to be larger than that of the covering part positioned between the reinforcement materials in the hose axial direction.

8. The hose according to any one of claims 1, 2, 3 and 4, wherein the dimension of the bottom of the reinforcement material in the hose axial direction is set to be the same as that of the covering part positioned between the reinforcement materials in the hose axial direction.

9. The hose according to any one of claims 1, 2, 3 and 4, wherein the receiving surface of the reinforcement material is made flat and the angle formed by the flat bottom surface and the receiving surface of the reinforcement material is set within a range of 30 to 80 degrees.

* * * * *